(12) United States Patent
Thompson et al.

(10) Patent No.: US 12,304,612 B2
(45) Date of Patent: May 20, 2025

(54) AUTOMATED CABIN-DIVIDER DOOR

(71) Applicant: Textron Aviation Inc., Wichita, KS (US)

(72) Inventors: Justin Eugene Thompson, Haysville, KS (US); Kenneth Matthew Cumming, Derby, KS (US); Morgan Christopher Brown, Wichita, KS (US); Anthony Westhoff, Andover, KS (US); Andrew Kent Johnson, Maize, KS (US)

(73) Assignee: Textron Innovations Inc., Providence, RI (US)

( * ) Notice: Subject to any disclaimer, the term of this patent is extended or adjusted under 35 U.S.C. 154(b) by 200 days.

(21) Appl. No.: 18/057,037

(22) Filed: Nov. 18, 2022

(65) Prior Publication Data

US 2023/0159152 A1 May 25, 2023

Related U.S. Application Data

(60) Provisional application No. 63/281,200, filed on Nov. 19, 2021.

(51) Int. Cl.
*B64C 1/14* (2006.01)
*E05F 15/603* (2015.01)
*E05F 15/70* (2015.01)

(52) U.S. Cl.
CPC .......... *B64C 1/1469* (2013.01); *E05F 15/603* (2015.01); *E05F 15/70* (2015.01)

(58) Field of Classification Search
CPC .................................................. B64C 1/1469
See application file for complete search history.

(56) References Cited

U.S. PATENT DOCUMENTS

| 2005/0073425 | A1* | 4/2005 | Snell | E05F 3/224 340/545.1 |
|---|---|---|---|---|
| 2016/0318601 | A1* | 11/2016 | Arnold | B64C 13/16 |
| 2018/0265216 | A1* | 9/2018 | Breigenzer | E05B 81/70 |
| 2020/0407036 | A1* | 12/2020 | Zekiecki | E05B 77/22 |

(Continued)

FOREIGN PATENT DOCUMENTS

| CN | 114199546 A | 3/2022 |
|---|---|---|
| DE | 102016103825 A1 | 9/2017 |

(Continued)

*Primary Examiner* — Joshua J Michener
*Assistant Examiner* — Cindi M Curry
(74) *Attorney, Agent, or Firm* — Avek IP, LLC (57) ABSTRACT

A system for an automated cabin-divider door for an aircraft includes a door, a motor for moving the door to an open position, a limit switch configured to detect when the door is in a fully open position and to stop the motor, and electronics coupling the motor and the limit switch to an avionics system. The avionics system determines when the door is to be opened and provides a signal to the motor for moving the door to the fully open position. A method for automatically opening the cabin-divider door includes determining whether the aircraft is on the ground or in flight, determining whether the aircraft is taxiing, and determining whether the aircraft is in a final phase of approach. When the aircraft is taxiing or in the final phase of approach, the method includes sending a command signal to the motor for opening the cabin-divider door.

16 Claims, 5 Drawing Sheets (56) References Cited

U.S. PATENT DOCUMENTS

2021/0123278 A1* 4/2021 Chambers ............. E05D 15/248
2023/0047605 A1* 2/2023 Müller ............... G07C 9/00174

FOREIGN PATENT DOCUMENTS

EP          3546690 B1    3/2021
EP          3129281 B1    5/2022
WO     WO-2021214191 A1 * 10/2021  ............. B64D 11/02

* cited by examiner

AUTOMATED CABIN-DIVIDER DOOR

CROSS-REFERENCE TO RELATED APPLICATIONS

This application claims the benefit of priority of U.S. Provisional Patent Application No. 63/281,200 entitled Automated Cabin-Divider Door and filed on Nov. 19, 2021, the disclosure of which is herein incorporated by reference in its entirety.

BACKGROUND OF THE INVENTION

1. Field

The disclosed embodiments relate generally to the field of aircraft doors. More specifically, embodiments relate to an automated divider door for aircraft.

2. Description of the Related Art

Divider-doors in aircraft cabin are known. For example, DE102016103825A1 publication to Lange discloses a first door for closing a first access opening and a second door for closing a second access opening. EP3129281B1 publication to Seibt discloses a retaining system for an aircraft lavatory door including a retaining device and a locking device. EP3546690B1 to Long et al. discloses a bi-fold door having a first panel pivotably connected to a second panel via a living hinge. CN114199546A publication discloses a system for testing durability of a sliding cockpit door having a pushing mechanism and a limiting mechanism.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a system for an automated cabin-divider door for an aircraft includes: a door; a motor operatively connected to the door for moving the door to an open position; a limit switch configured to detect when the door is in a fully open position and to stop the motor; and electronics coupling the motor and the limit switch to an avionics system of the aircraft, wherein the avionics system determines when the door is to be opened and provides a signal to the motor for moving the door to the fully open position.

In another embodiment, a method for automatically opening a cabin-divider door for an aircraft includes: determining whether the aircraft is on the ground or in flight; when the aircraft is on the ground, determining whether the aircraft is taxiing, and when the aircraft is taxiing, automatically sending a command signal via an avionics system to a motor for opening the cabin-divider door; when the aircraft is in flight, determining whether the aircraft is in a final phase of approach; and when the aircraft is in the final phase of approach, sending the command signal via the avionics system to the motor for opening the cabin-divider door.

BRIEF DESCRIPTION OF THE SEVERAL VIEWS OF THE DRAWINGS

Illustrative embodiments are described in detail below with reference to the attached drawing figures, which are incorporated by reference herein and wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Many aircraft are equipped with divider doors for separating different compartments of the aircraft. For example, a divider door may reside in a portion of the cabin between a main cabin seating area and a galley or refreshment center, between a crew area and a passenger area, etc. When the divider door is in a path of an emergency exit, aircraft regulations require that the divider door be open during takeoff and landing. Existing divider doors are manually stowed by an operator (e.g., a passenger or flight crew member), who either physically push or pull the doors open (e.g., by sliding the doors apart) or manually turn on a motor for opening a motorized door. The operator also verifies that the divider door is properly stowed. For example, even when the divider door is open prior to takeoff and landing, the operator must get up and check that the divider door is properly stowed to ensure that the door remains open during takeoff or landing.

Embodiments are generally directed to a system for automatically opening one or more divider doors in an aircraft cabin. In some embodiments, a signal is provided from an avionics system of the aircraft to automatically open the divider door prior to takeoff or landing. The avionics system, in embodiments, has direct access to aircraft components that are operated during certain phases of taxiing and landing approach, which enable the divider doors to be automatically opened at the appropriate times.

Figure 1:
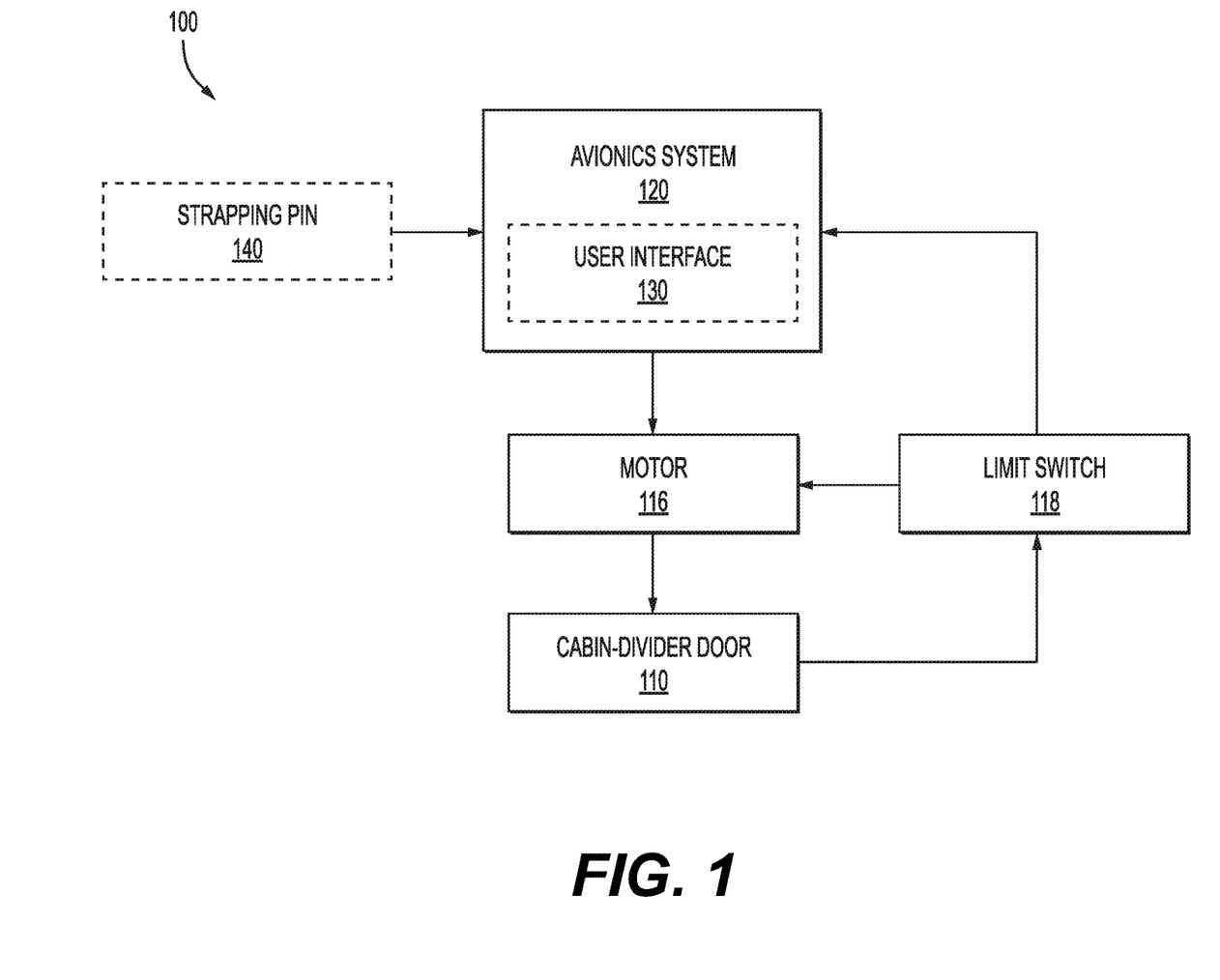
FIG. 1 is a block diagram of an automated cabin-divider door system, in an embodiment.
Figure 2A:
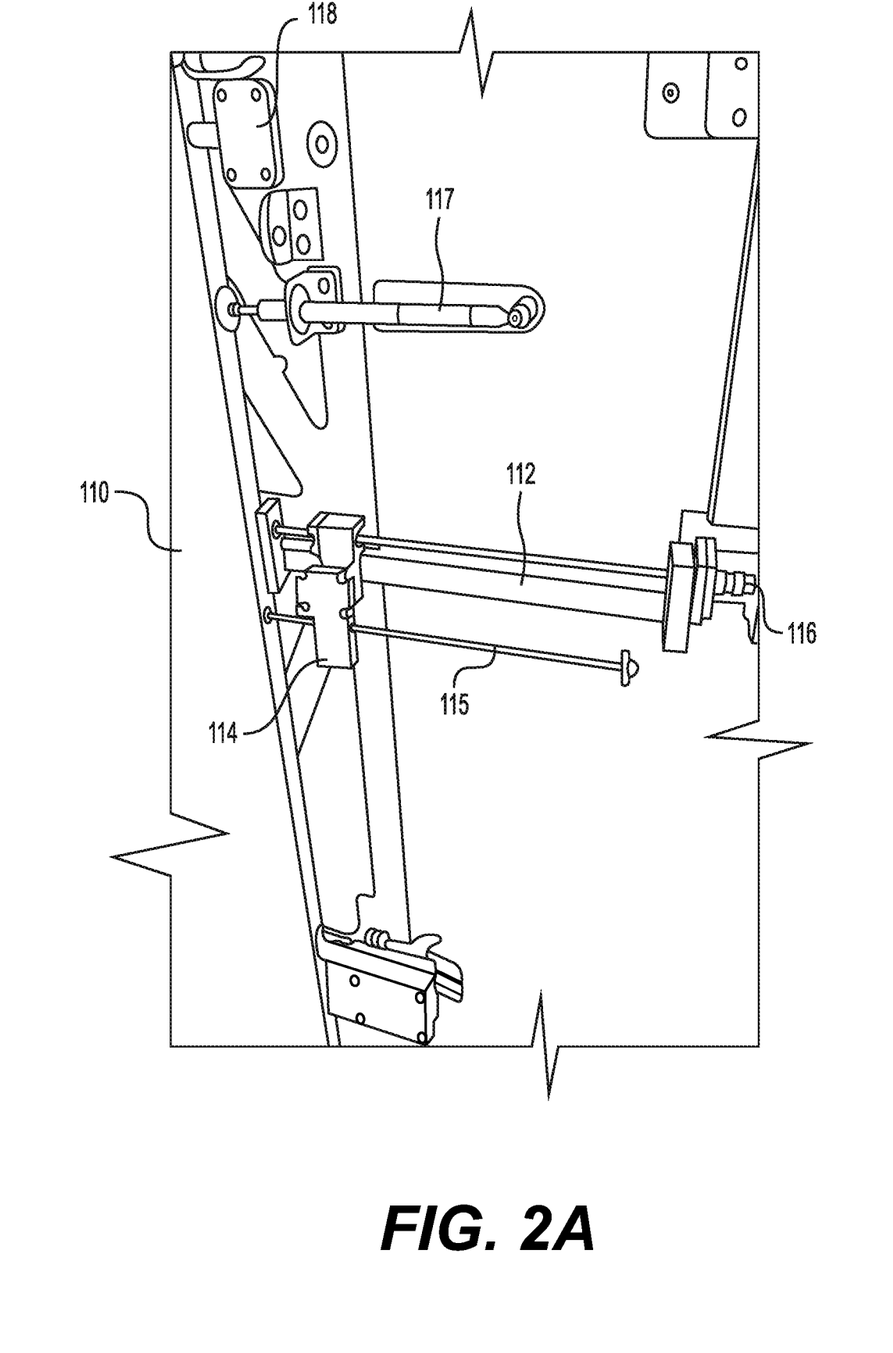
FIG. 2A shows a cabin-divider door of the system of FIG. 1 in an open position, in an embodiment.
Figure 2B:
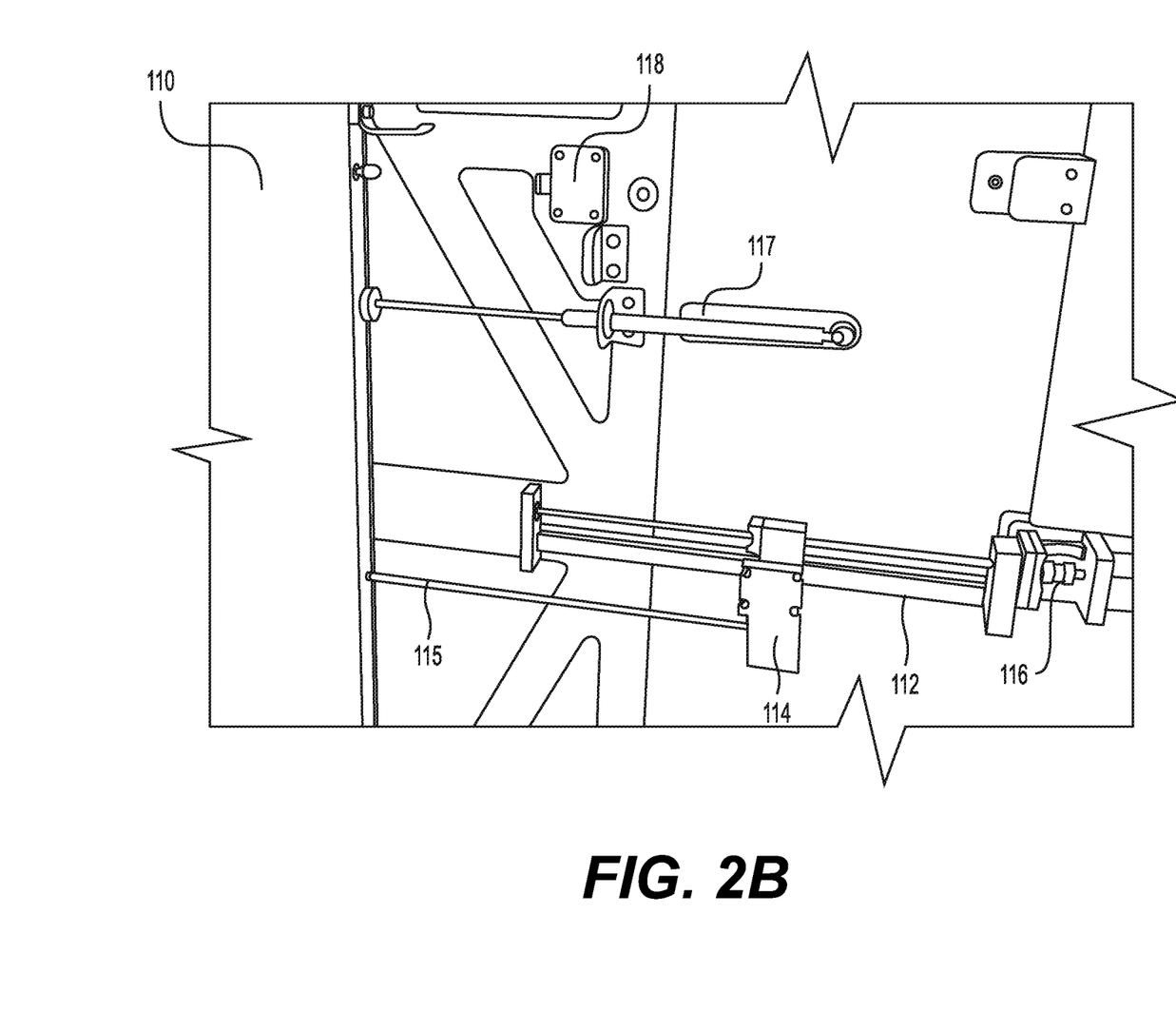
FIG. 2B shows the cabin-divider door of the system of FIG. 1 in a closed position, in an embodiment.

FIG. 1 is a block diagram of an exemplary system for an automated cabin-divider door system 100. A cabin-divider door 110 is for example a sliding door or a pair of sliding doors. However, cabin-divider door 110 may be a swinging door without departing from the scope hereof. Cabin-divider door 110 is configured for separating sections or areas of an aircraft cabin, such as a galley from a main cabin. A motor 116 is operatively coupled to cabin-divider door 110 for opening the door. Motor 116 may be a brushless DC motor configured to move door 110. Motor 116 may be operatively coupled to door 110 via gearing, cables, rods, rails, carriage assemblies, etc. Door 110 may include wheels or rollers for assisting movement. A track in the aircraft floor may be configured for guiding door 110. In embodiments, cabin-divider door 110 includes a pair of doors and motor 116 includes a pair of motors, with each motor being operatively coupled to a respective door. An exemplary cabin-divider door 110 is shown in FIGS. 2A and 2B.

In embodiments, motor 116 is configured to open cabin-divider door 110 only and is not configured to close door 110. For example, motor 116 has a one way coupling with door 110, which allows motor 116 to move door 110 open but not closed. Instead, a user may manually close the doors by pushing or pulling by hand, which overcomes the resistive force of motor 116. The user may close the doors completely or partially. A latch or similar mechanism may be installed on door 110 for securing the door in the open configuration.

A limit switch 118 may be used for detecting when cabin-divider door 110 is fully open and for stopping motor 116. Limit switch 118 is an electromechanical device capable of being actuated to operate an electrical switch. For example, limit switch may include a physical button or lever to be actuated or limit switch may use another sensing mechanism (e.g., electromagnetic, infrared light, etc.) to determine that door 110 is fully open. In embodiments, limit switch 118 is a proximity switch. Limit switch 118 may be used to break electrical power to motor 116 such that motor 116 is powered off. Alternatively, a command signal may be sent from limit switch 118 directly to motor 116, or indirectly via avionics system 120, to power off motor 116. In embodiments, a button or lever of limit switch 118 may be actuated by door 110 when the door reaches a fully open position.

An avionics system 120 is communicatively coupled with motor 116. Avionics system 120 may comprise any type of electronics system for aircraft including navigation, communications, flight control, collision avoidance, etc. Avionics system 120 may also comprise one or more controllers, such as a computer, a microcontroller, a microprocessor, or a programmable logic controller (PLC), and one or more printed circuit boards (PCBs). Each of the one or more controllers includes a memory, including a non-transitory medium for storing software, and a processor for executing instructions of the software. The memory may be used to store information used by the controller, including but not limited to instructions, algorithms, lookup tables, etc. The software may be an automated cabin-divider door software configured to receive inputs from avionics system 120, process information based on the inputs, and transmit a signal to motor 116 based on the processed information. The controller may further include one or more switches (e.g., for switching motor 116 on or off) and be configured to operate the one or more switches. An optional user interface 130 enables a user to transmit instructions and receive information, as further described below. The controller is not limited by the materials from which it is formed or the processing mechanisms employed therein and, as such, may be implemented via semiconductor(s) and/or transistors (e.g., electronic integrated circuits (ICs)), and so forth. In embodiments, avionics system 120 is configured to access information via the controller about various flight control functions onboard the aircraft. For example, avionics system 120 may receive information regarding flap position, landing gear position, engine status, crew-alert system status, and a weight-on-wheels status, among other things.

In operation, automated cabin-divider door system 100 receives information from avionics system 120 and determines whether cabin-divider door 110 should be automatically opened. When door 110 is to be opened, motor 116 is commanded to operate, thereby opening door 110. When door 110 is fully opened, limit switch 118 is actuated and motor 116 stops. An exemplary method of operation of door 110 is described below in connection with FIG. 3.

Figure 4:
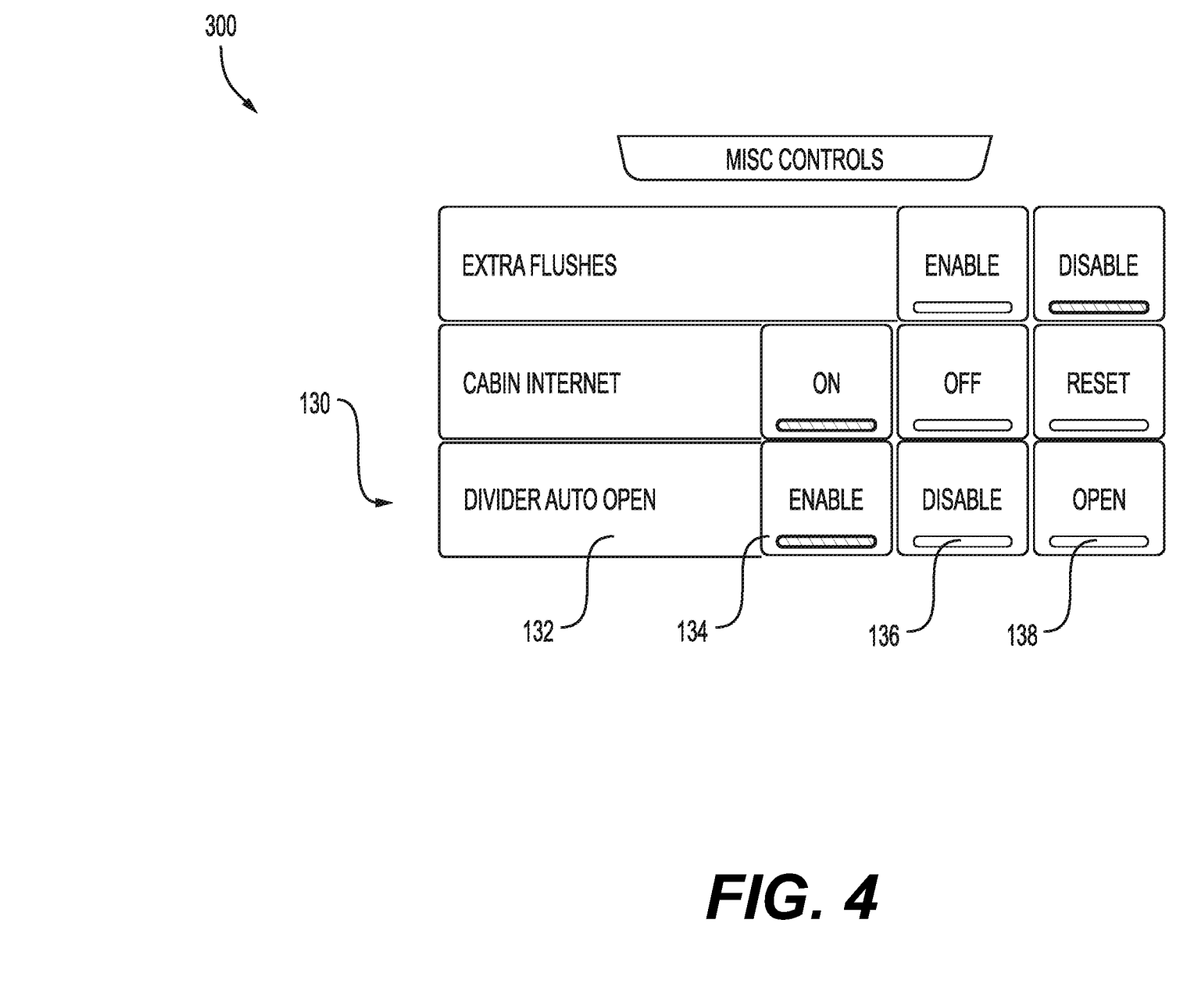
FIG. 4 is a depiction of a graphic user interface used in connection with the system of FIG. 1 and the method of FIG. 3, in an embodiment.

Optional user interface 130 may be part of avionics system 120, as depicted in FIG. 1. Alternatively, user interface 130 may be communicatively coupled with avionics system 120. User interface 130 may comprise one or more buttons or switches for receiving inputs related to automated cabin-divider door system 100. In embodiments, user interface 130 comprises a touchscreen capable of receiving touch inputs from a user. User interface 130, in embodiments, provides a selection to enable or disable an automated feature for opening door 110. Additionally, user interface 130 may provide a selection for a crew member to manually command door 110 open. User interface 130 may be present on a crew member's display in the aircraft cockpit. For example, user interface 130 may appear on an inboard touchscreen, a pilot main flight display and/or a co-pilot main flight display. An exemplary depiction of user interface 130 is shown in FIG. 4 and described below.

An optional strapping pin 140 may be installed in wiring of cabin-divider door 110 when motor 116 is installed. In embodiments, avionics system 120 senses when strapping pin 140 is installed or uninstalled and displays or hides user interface 130 accordingly. In embodiments, strapping pin 140 is an electrical pin of avionics system 120 that is wired to ground, which lets avionics system 120 know that automated cabin-divider door system 100 is installed. In some embodiments, user interface 130 is present on a display for a crew member only when motor 116 is installed and operational based on the presence of strapping pin 140. Otherwise, when strapping pin 140 is removed, user interface 130 may be removed from the flight display of a crew member.

FIGS. 2A and 2B depict cabin-divider door 110 for opening and closing a doorway. FIG. 2A shows door 110 in an open position and FIG. 2B shows door 110 in a closed position. In the embodiment of FIGS. 2A and 2B, cabin-divider door 110 is configured as a pair of sliding doors that slide in an outboard direction to open and come together in an inboard direction when closed. However, only one door of the pair of sliding doors is shown in FIGS. 2A and 2B for clarity of illustration. Motor 116 is coupled to cabin-divider door 110 via a rail 112, a carriage assembly 114 and a rod 115. Rail 112 is mounted to a cabin-divider wall adjacent the doorway and aligned in a transverse direction (i.e., across the aircraft in an inboard-outboard direction). Rod 115 is fixed to door 110 and coupled to carriage assembly 114 in a one-way manner. Specifically, rod 115 is configured to slide through carriage assembly 114 until an end of rod 115 is reached. The end of rod 115 is configured to catch carriage assembly 114 such that when motor 116 moves carriage assembly 114 to the open position, door 110 moves with carriage assembly 114 via rod 115. In embodiments, upon manually closing door 110, motor 116 reverses polarity and drives carriage assembly 114 back to the closed position in anticipation for reopening door 110. However, rod 115 slides freely through carriage assembly 114 such that door 110 is not closed.

In operation, when door 110 is fully opened, a resistive force of motor 116 may be used to hold door 110 open. Additionally, a latch (not shown) may be used to secure door 110 open. The latch is configured for a user to override enabling the user to close door 110 manually. An optional gas spring 117 may assist with closing door 110 by applying a biasing force against door 110 towards the open position. With optional gas spring 117 installed, when a user unlatches the door from the open position, the force applied by the gas spring 117 automatically pushes the door 110 to the closed position. Alternatively, without optional gas spring 117 installed, door 110 may be manually moved inboard to the closed position once the carriage assembly 114 is moved inboard along rail 112 via motor 116.

Figure 3:
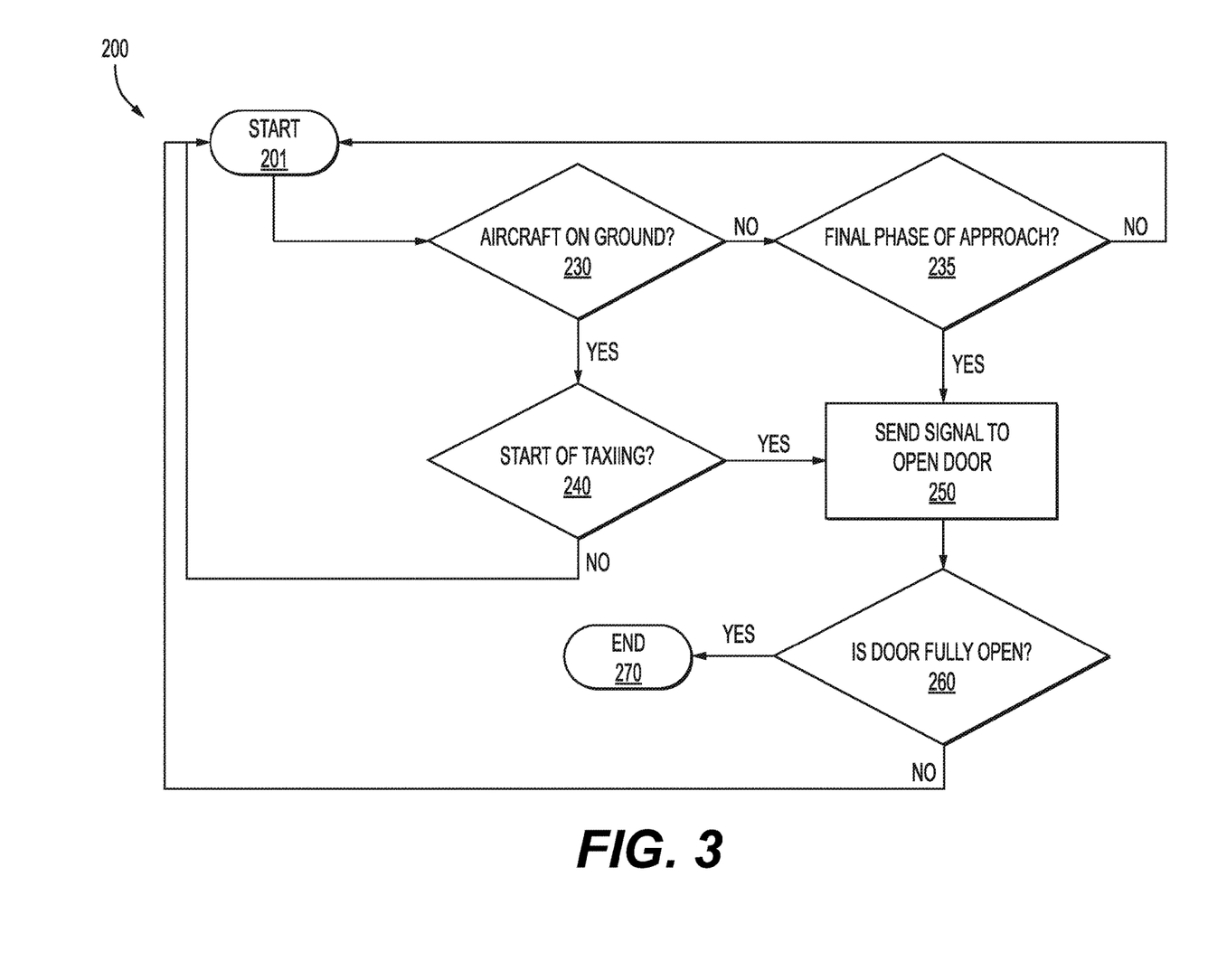
FIG. 3 is a flow diagram of an automated cabin-divider door method, in an embodiment.

FIG. 3 is a flow diagram of an exemplary automated cabin-divider door method 200. Method 200 starts with a step 201. The steps of method 200 may be performed in the order shown or in a different order without departing from the scope hereof. Before method 200 starts, the aircraft is powered on. For example, all aircraft power busses are on and powered including avionics system 120. Avionics system 120 may then confirm that all aircraft power busses are powered on before starting method 200. Additionally, avionics system 120 may confirm that the automated cabin-divider door software is operating prior to starting method 200. In embodiments, the automated cabin-divider door software comprises code stored in memory of a controller, and avionics system 120 determines whether the controller is operating. The controller may be part of a subsystem of avionics system 120, such as a crew-alert system for example. Alternatively, the controller may be part of a cabin management system and avionics system 120 is communicatively coupled with the cabin management system for determining whether the automated cabin-divider door software is operating.

In a step 230, a determination is made as to whether the aircraft is on the ground. In an example of step 230, avionics system 120 may receive a signal indicative of the aircraft being on the ground. The signal may be a "weight-on-wheels" signal, for example. If the avionics system 120 determines that the aircraft is on the ground ("YES" in FIG. 3), method 200 proceeds with a step 240. If avionics system 120 does not receive the signal indicative of the aircraft being on the ground ("NO in FIG. 3), then avionics system 120 determines that the aircraft is airborne, and method 200 proceeds to a step 235.

In step 235, a determination is made as to whether the aircraft is in a final phase of approach. In an example of step 235, avionics system 120 determines whether the aircraft is approaching landing. In some embodiments, avionics system 120 receives a signal indicative of a flap position. If the flaps are in a deployed position (e.g., fully deployed or partially deployed), avionics system 120 determines that the aircraft is in the final phase of approach. Otherwise, if the flaps are stowed, avionics system 120 determines that the aircraft is not in the final phase of approach. In certain embodiments, avionics system 120 receives a signal indicative of a landing gear position. If the landing gear is deployed, avionics system 120 determines that the aircraft is in the final phase of approach. For example, avionics system 120 may determine that the main landing gear is down and locked. Otherwise, if the landing gear is not deployed (e.g., the main gear is stowed), avionics system 120 determines that the aircraft is not in the final phase of approach. Step 235 may determine whether the aircraft is approaching landing based on the flap position, the landing gear position, or both, without departing from the scope hereof.

If in step 235 the avionics system 120 determines that the aircraft is not in the final phase of approach ("NO" in FIG. 3), then method 200 returns to start 201. Otherwise, if the avionics system 120 determines that the aircraft is in the final phase of approach ("YES" in FIG. 3), then method 200 proceeds to a step 250.

In step 240, a determination is made as to whether the aircraft has started taxiing. In an example of step 240, avionics system 120 receives signals that engines are running, a group of electrical buses are powered, and associated avionics units are operating. Additionally or alternatively, avionics system 120 receives a signal indicative of ground speed. For example, avionics system 120 may receive a signal indicative of wheel speed, GPS ground speed, etc. If in step 240 the avionics system 120 determines that the aircraft has not started taxiing, ("NO" in FIG. 3), then method 200 returns to start 201. Otherwise, if the avionics system 120 determines that the aircraft has started taxiing ("YES" in FIG. 3), then method 200 proceeds to step 250. In embodiments, a predetermined ground speed may be used to determine that the aircraft has started taxiing (e.g., greater than one mile-per-hour).

In step 250, a signal is sent to open the door. In an example of step 250, avionics system 120 sends a command signal to motor 116 for opening cabin-divider door 110. In embodiments, when avionics system 120 sends the command signal to motor 116, a ground signal is provided to a relay, which energizes to provide power to motor 116. Motor 116 may continue to operate until door 110 is fully open (e.g., fully stowed in an outboard position). For example, limit switch 118 or another detection mechanism may be used to provide a command signal to motor 116 for stopping or turning off when the door 110 is fully open. Alternatively, motor 116 may operate for a predetermined duration configured to fully open door 110 without receiving any feedback. Once door 110 is fully open, the door may be latched in the open configuration, or motor 116 may provide a resistive force sufficient to maintain door 110 fully open during flight. In some embodiments, motor 116 provides a resistive force sufficient to maintain door 110 fully open, and a latch is employed to secure the door open.

If a failure of automated cabin-divider door system 100 occurs, a user may manually move (e.g., push or pull) door 110 to the open position by overcoming any resistive force of motor 116 without operating the motor 116. If a latch is employed, the latch is configured for unlatching by the user. Therefore, in the event of an emergency, cabin-divider door 110 may be opened despite any failure of system 100.

In a step 260, a signal is received when the door is fully open. In an example of step 260, avionics system 120 receives a signal from limit switch 118 that door 110 is fully open, and avionics system 120 commands motor 116 to stop.

Alternatively, motor 116 receives a signal directly from limit switch 118 to stop. In some embodiments, motor 116 is powered off when stopped and a latch (not shown) is used to secure door 110 fully open. Alternatively, motor 116 remains powered when stopped for maintaining door 110 fully opened.

In a step 270, method 200 ends when the cabin-divider door is fully open. In an example of step 270, avionics system 120 receives a signal from limit switch 118 that cabin-divider door 110 is fully open and method 200 ends. In another example of step 270, open button 138 of user interface 130 is pressed to transmit a command for fully opening cabin-divider door 110.

Method 200 may be repeated periodically (e.g., every second or every minute) during flight in case cabin-divider door 110 needs to be re-opened. For example, after takeoff a user may manually close cabin-divider door 110, and method 200 continues to operate during flight. When the flight enters the final phase of approach, method 200 detects the final phase of approach in step 235, and a command signal is sent to motor 116 to open door 110 in step 250.

Optionally, a caution message may be displayed via the crew-alert system (CAS) when cabin-divider door 110 should be fully open but is not. For example, a CAS message may be displayed in the cockpit anytime the doors are not in the fully stowed position. In some embodiments, the CAS message has an advisory display for when it is okay for door 110 to be closed and a caution display for when the door should be fully open. For example, the advisory display may be displayed in a first color (e.g., white) and the caution display may be displayed in a second color (e.g., amber). In some embodiments, no CAS message is displayed under certain conditions when door 110 may be open or closed, such as during a cruise phase of flight (e.g., above 18,000-ft). The CAS message avoids having a crew member go check that door 110 is fully open.

FIG. 4 provides an exemplary depiction of user interface 130 located on a display 300 for use in connection with automated cabin-divider door system 100 of FIG. 1 and automated cabin-divider door method 200 of FIG. 3. User interface 130, as depicted in FIG. 4, is displayed on display 300 within the cockpit when strapping pin 140 is present to indicate the presence of system 100, as described above. Display 300 may be a touchscreen in the cockpit, such as an inboard touchscreen, for example. If user interface 130 fails to properly display on the pilot main flight display, user interface 130 may be displayed on a copilot main flight display, either as a backup or in duplicate. Other displays within the cockpit may be used to display user interface 130 to crew members without departing from the scope hereof.

A label 132 is displayed on user interface 130 to identify the automated cabin-divider door feature. An enable indicator 134 displays an indication as to whether automated cabin-divider door system 100 is enabled. For example, an illuminated portion of enable indicator 134 in FIG. 4 is brightly lit to indicate that system 100 is enabled. Similarly, a disable indicator 136 is configured to display when system 100 is disabled. An open button 138 is configured to indicate that opening of cabin-divider door 110 has been selected. When strapping pin 140 is not present, user interface 130 is not displayed on display 300 and the door indication is set to "disable" for any logic to use.

In some embodiments, user interface 130 is configured as a touch screen display such that indicators 134, 136, and 138 are each configured as a touch sensitive button for receiving touch input from a user. For example, automated cabin-divider door system 100 may be enabled by touching indicator 134 or disabled by touching indicator 136, and cabin-divider door 110 may be manually opened by touching indicator 138. Upon receiving a touch input, illumination of the appropriate indicator(s) changes accordingly. In embodiments, only one of the enable, disable, and open radio buttons 134, 136, 138 may be active at a time.

Advantages of embodiments disclosed herein include that cabin-divider doors are automatically opened at key phases of flight to ensure access to emergency exits.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A system for an automated cabin-divider door for an aircraft, comprising:
   a door;
   a motor operatively connected to the door for moving the door to an open position;
   a limit switch configured to detect when the door is in a fully open position and to stop the motor,
   wherein the motor and the limit switch are communicatively coupled to an avionics system of the aircraft, wherein the avionics system determines when the door is to be opened and provides a signal to the motor for moving the door to the fully open position; and
   an electrical pin operatively coupled to the avionics system, wherein the electrical pin is configured to communicate a signal to the avionics system to indicate that the motor is installed and operational.

2. The system of claim 1, comprising a touchscreen user interface communicatively coupled with the avionics system, wherein the touchscreen user interface is configured to receive an instruction for opening the door.

3. The system of claim 2, wherein the touchscreen user interface is configured to display an open button for commanding the door to a fully open position.

4. The system of claim 2, wherein the touchscreen user interface is configured to display an enable indicator for indicating that the automated cabin-divider door system is enabled.

5. The system of claim 1, comprising:
   a rail mounted on a cabin-divider wall and aligned in a transverse direction;
   a carriage assembly coupled to the rail for sliding along the rail; and
   a rod fixed to the door and coupled to the carriage assembly in a one-way manner, wherein the motor is configured to move the carriage assembly along the rail, and the rod is configured to be pulled by the carriage assembly when the carriage assembly is moving in an outboard direction along the rail for opening the door, wherein the rod is configured to slide freely through the carriage assembly when the carriage assembly is moving in an inboard direction along the rail.

6. The system of claim 5, wherein the motor is configured to provide a resistive force against the rod via the carriage assembly for maintaining the door in the open configuration.

7. The system of claim 5, comprising a gas spring configured for biasing the door towards a closed position, wherein the gas spring pushes the door inboard for automatically closing the door as the rod slides freely through the carriage assembly.

8. A method for automatically opening a cabin-divider door for an aircraft, comprising:
    determining whether the aircraft is on the ground or in flight;
    when the aircraft is on the ground, determining whether the aircraft is taxiing, and when the aircraft is taxiing, automatically sending a command signal via an avionics system to a motor for opening the cabin-divider door;
    when the aircraft is in flight, determining whether the aircraft is in a final phase of approach;
    when the aircraft is in the final phase of approach, sending the command signal via the avionics system to the motor for opening the cabin-divider door;
    when the cabin-divider door reaches a fully open position, transmitting a signal from a limit switch communicatively coupled to the motor for commanding the motor to stop;
    maintaining electrical power to the motor for providing a resistive force by the motor to hold the cabin-divider door open; and
    powering the motor off for returning the cabin-divider door to a closed position via a gas spring.

9. The method of claim 8, wherein determining whether the aircraft is on the ground or in flight comprises receiving via the avionics system a weight-on-wheels signal.

10. The method of claim 8, wherein determining whether the aircraft is taxiing comprises receiving via the avionics system a signal indicative of a ground speed.

11. The method of claim 8, wherein determining whether the aircraft is in a final phase of approach comprises receiving via the avionics system a signal indicative of a flap position.

12. The method of claim 8, wherein determining whether the aircraft is in a final phase of approach comprises receiving via the avionics system a signal indicative of a landing gear position.

13. The method of claim 8, wherein sending the command signal via the avionics system to the motor comprises sending a ground signal to a relay for energizing the relay, thereby providing electrical power to the motor for opening the cabin-divider door.

14. The method of claim 8, comprising manually moving the cabin-divider door to the open position thereby overcoming a resistive force of the gas spring.

15. The method of claim 8, comprising providing a signal to the avionics system via a strapping pin to indicate when the motor is installed.

16. The method of claim 8, comprising displaying a caution message via a crew-alert system when the cabin-divider door is not fully open but should be fully open.

* * * * *